United States Patent [19]

Hagemeister

[11] Patent Number: 4,699,523

[45] Date of Patent: Oct. 13, 1987

[54] AERODYNAMIC RADIAL BEARING

[75] Inventor: Klaus Hagemeister, Munich, Fed. Rep. of Germany

[73] Assignee: MTU Motoren-und Turbinen-Union Muenchen GmbH, Munich, Fed. Rep. of Germany

[21] Appl. No.: 14,082

[22] Filed: Feb. 2, 1987

Related U.S. Application Data

[63] Continuation of Ser. No. 642,872, Aug. 20, 1984, abandoned.

[30] Foreign Application Priority Data

Sep. 1, 1983 [DE] Fed. Rep. of Germany ....... 3331503

[51] Int. Cl.$^4$ ............................................. F16C 32/06
[52] U.S. Cl. .................................... 384/103; 384/106
[58] Field of Search ................ 384/99, 100, 103, 105, 384/106, 114, 119, 397, 124

[56] References Cited

U.S. PATENT DOCUMENTS

| | | | |
|---|---|---|---|
| 4,223,958 | 9/1980 | Gray | 384/99 |
| 4,295,689 | 10/1981 | Licht | 384/103 |
| 4,415,280 | 11/1983 | Agrawal | 384/103 |
| 4,526,483 | 7/1985 | Hishikawa et al. | 384/103 |

FOREIGN PATENT DOCUMENTS

| | | | |
|---|---|---|---|
| 2934271 | 11/1983 | Fed. Rep. of Germany. | |
| 625064 | 9/1978 | U.S.S.R. | 384/103 |

Primary Examiner—Stuart S. Levy
Assistant Examiner—David Werner
Attorney, Agent, or Firm—W. G. Fasse; D. H. Kane, Jr.

[57] ABSTRACT

An aerodynamic radial bearing has two foil sections located in a gap between an outer bearing shell (1) and the bearing shaft. The foil sections encircle or loop around the bearing shaft in several layers and include an inner foil section and an outer foil section. Each section may have one or several foil or band portions. The inner foil section closer to the shaft forms the bearing running surface and the outer foil section closer to the shell wall forms a support of predetermined elasticity or desired stiffness. The outer end of the outer foil section is secured to the bearing shell. At least one foil or band portion of the inner foil section is wrapped in opposition to the direction (D) of rotation of the shaft (2) and is connected (at 5, 10 11) to at least one further foil or band portion of the outer foil section which is wrapped in the direction (D) of rotation of the shaft (2). These features eliminate the troubles encountered heretofore in operation of such bearings due to contaminant particles since these particles can no longer accumulate in the running gap.

20 Claims, 6 Drawing Figures

AERODYNAMIC RADIAL BEARING

This application is a continuation, of application Ser. No.: 642,872, filed Aug. 20, 84 now abandoned.

FIELD OF THE INVENTION

The invention relates to an aerodynamic radial bearing, especially for high speed fluid flow engines. Such bearings comprise a foil between the outer bearing sleeve and the bearing shaft. The foil or film encircles the bearing shaft with a plurality of turns, whereby the outer end of the foil or film is secured to the bearing sleeve. The terms "foil" and "film" are used interchangeably herein.

DESCRIPTION OF THE PRIOR ART

A bearing as just described is known from the (DE-OS) No. 2,934,271. These bearings are also known as so-called foil-air bearings which are, for example, advantageously used in fluid flow engines such as turbines or jet engines operating at comparatively high rotational shaft speeds of approximately 40,000 to 200,000 revolutions per minute. Such foil-air bearings are characterized by a high temperature load capacity, and can also handle high mechanical loads. Both characteristics are distinct advantages of such bearings.

In these foil-air bearings, comprising multiple wrapped foil layers, the necessary damping of a bearing is achieved primarily by the friction between the individual foil layers, and by the so-called "squeeze-film effect" of the air films lying between the separate foil layers (squeeze-gap film damping). This type of damping is mainly achieved by the foil layers which determine and encircle the contact or running surface of the bearing and form an inner foil band section. An outer foil band section or outer foil part which is joined to the just mentioned inner foil band section, then mainly defines the spring action and stiffness of the bearing. In such a known bearing the outer foil band section is, for example, constructed as a uniformly waved band extending around the bearing circumference. In general, the foil or film for such foil-air bearings has a foil or film thickness of approximately 30 to 80μ which is most advantageous, in combination with a relatively high tensile limit strength for the foil. This is especially true with respect to the above mentioned outer band section, which must provide the necessary spring action and stiffness of the bearing. The material of which these foils or films are made may be selected, for example from a precipitation-hardenable steel with a high chromium content, a nickel-based alloy, or a so-called "superalloy" with a high chromium and molybdenum content.

In such known foil-air bearings with foils wrapped repeatedly over each other, one end of the foil band is located in the inner foil band section forming the contact or running surface of the bearing. This one foil band end frequently becomes a trouble spot. The remaining outer end of the foil is secured in the bearing housing, in order to prevent a co-rotation of the foil bearing or foil packet along with the shaft. In the initially mentioned known case, the rotating shaft must rotate in the direction of the wrapping direction of the foil, so that the foil may be spread open in the running surface of the bearing by the effect of the arising friction. If such spreading does not occur, the foil will be drawn tightly around the rotating shaft, whereby it functions as a band brake. Thus, with the above mentioned direction of rotation of the inner bearing shaft, the cut edge of the end of the foil located on the running surface of the bearing directly opposes the direction of rotation of the rotating shaft. It has been observed, that pollutants or impurities in the air, which are present in the bearing during operation, accumulate at the just mentioned cut edge of the foil segment which forms the running surface of the bearing. The accumulated impurities then cause forces at the cut edge where these forces interfere with the proper operation of the bearing, thereby severely impairing the function of the bearing or even lead to the destruction of the bearing.

OBJECTS OF THE INVENTION

In view of the above it is the aim of the invention to achieve the following objects singly or in combination:

to construct a foil-air bearing in which no interference or damage occurs, despite the presence of contaminant particles in the air inside the bearing;

to provide such an improved bearing wherein the basic advantages of foil-air bearings such as a high mechanical and temperature load capacity are not impaired;

to arrange the foil layers in a foil-air bearing so that a frictional band-brake effect is avoided;

to make sure that tangential forces effective on the foil layers will tend to spread the foil layers rather than tightening the foil layers; and to arrange the foil portion which is in contact with the shaft so that the mentioned cut edge of the foil faces in the direction of shaft rotation.

SUMMARY OF THE INVENTION

The above objects have been achieved in an aerodynamic radial bearing according to the invention, wherein at least one inner band portion of an inner foil section is wrapped in opposition to the direction of rotation of the shaft, and wherein said inner band portion is connected to at least one outer band portion of an outer foil section, said outer band portion being wrapped in the direction of rotation of the shaft.

In this manner, the wrapping direction of the basic structure of the foil-air bearing may be arranged with respect to the rotation direction of the bearing shaft in such a way that the structure expands due to tangential forces in the direction of rotation. This feature tends to provide the air bearing with more play. The outer band portion of the outer foil section, which is connected to the inner band portion of the inner foil section forming the contact or running surface of the bearing, may therefore advantageously be wrapped in the direction of rotation of the shaft, in order to produce the necessary expansion or widening of the foil. In contrast, the inner foil section forming the actual contact or running surface of the bearing which is located directly adjacent to the rotating shaft, is wrapped in the direction opposite to the shaft rotation direction. This inner foil section forming the bearing running surface is wrapped so that the inner end next to said cut edge lies in the run-off relative to the surface of the bearing shaft, so that no contaminant particles can become lodged especially at this location along the cut edge of the inner foil section.

This type of foil arrangement furthermore prevents that the foil wrapping or winding exerts a braking effect on the bearing, or rather on the inner bearing shaft.

Further advantageous embodiments of the invention are disclosed in the dependent claims.

BRIEF DESCRIPTION OF THE DRAWINGS

In order that the invention may be clearly understood, it will now be described by way of example, with reference to the accompanying drawings, wherein.

DETAILED DESCRIPTION OF PREFERRED EXAMPLE EMBODIMENTS AND OF THE BEST MODE OF THE INVENTION

In order to clarify the mode of operation of the bearings according to the invention, the respective foil sections in these various bearing embodiments have been drawn with comparatively thick walls. However, in actual use the foil thickness is as described above, namely e.g., 30 to 80μ.

Figure 1:
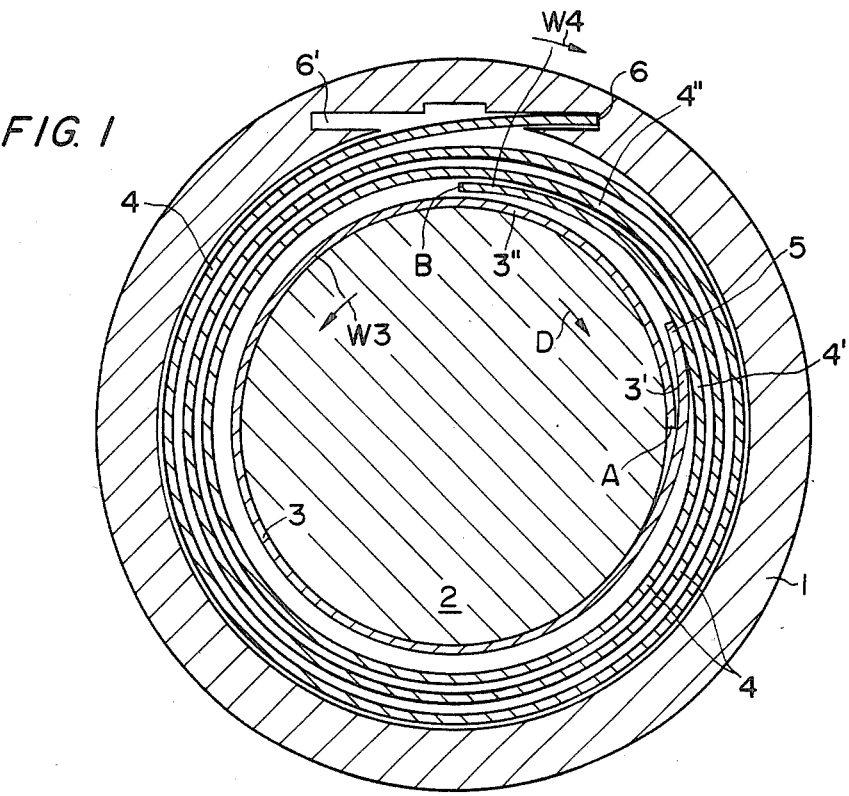
FIG. 1 shows a sectional view through one embodiment of a foil-air bearing according to the invention, wherein an inner and an outer foil band section are wrapped in opposite directions.

FIG. 1 shows an aerodynamic radial bearing for high speed fluid flow engines which comprises a foil packet having a plurality of windings wrapped around a bearing shaft 2. The foil packet is located between an outer bearing shell 1 and the inner bearing shaft 2. According to the basic teaching of the invention, the foil packet comprises an inner foil section 3 and an outer foil section 4. The inner foil section is located next to the shaft 2. The outer foil section is located next to the shell 1. The inner foil section 3 is wrapped in a wrapping direction W3 opposite the shaft rotation direction D. The outer foil section 4 is wrapped in the direction W4 corresponding to the direction D of shaft rotation. The inner band section 3 has an end portion 3' connected to a portion 4' of the outer band section 4 as shown at 5. The connection 5 between the foil or band portions 3' and 4' may be achieved at a point or over a partial foil or band circumference sector for example by soldering, diffusion welding, pressure welding, or ultrasonic welding.

FIG. 1 further shows that the cut edge A of the inner end of the inner band or foil section 3 is arranged in the run-off of the rotating shaft 2.

Stated differently, the cut edge A faces in the rotation direction D of the shaft 2. The radially inner end B which is the starting end of the outer foil section 4 is embedded between an inner foil or band portion 3'' and an outer foil or band portion 4''. These portions 3'', 4'' are adjacent to each other. Due to this overlapping arrangement of the foil portions and of the respective cut edges A and B, the accumulation of dirt or contaminant particles in the spaces adjacent to these cut edges A and B is prevented. Thus, no impairment of the bearing operation can occur. The wrapping direction W4 of the outer foil or band section 4, corresponding to the rotation direction D of the rotating shaft 2, allows the expansion of the outer foil or band section 4 necessary for trouble-free operation of the bearing.

As may further be seen from FIG. 1, the radially outer end of the foil or band section 4 is secured in a tangential slot 6 of the outer bearing shell 1, whereby this outer end may additionally be secured by a screw or bolt connection, for example. The inner and outer foil sections 3, 4 of FIG. 1 are substantially smooth walled sections cut off from standard tape type materials such as have been mentioned above. Incidentally, the slot 6 is a double slot with a slot portion 6' which could be used where the outer foil section 4 is to be wrapped in the opposite direction for respective opposite direction of shaft rotation.

Figure 2:
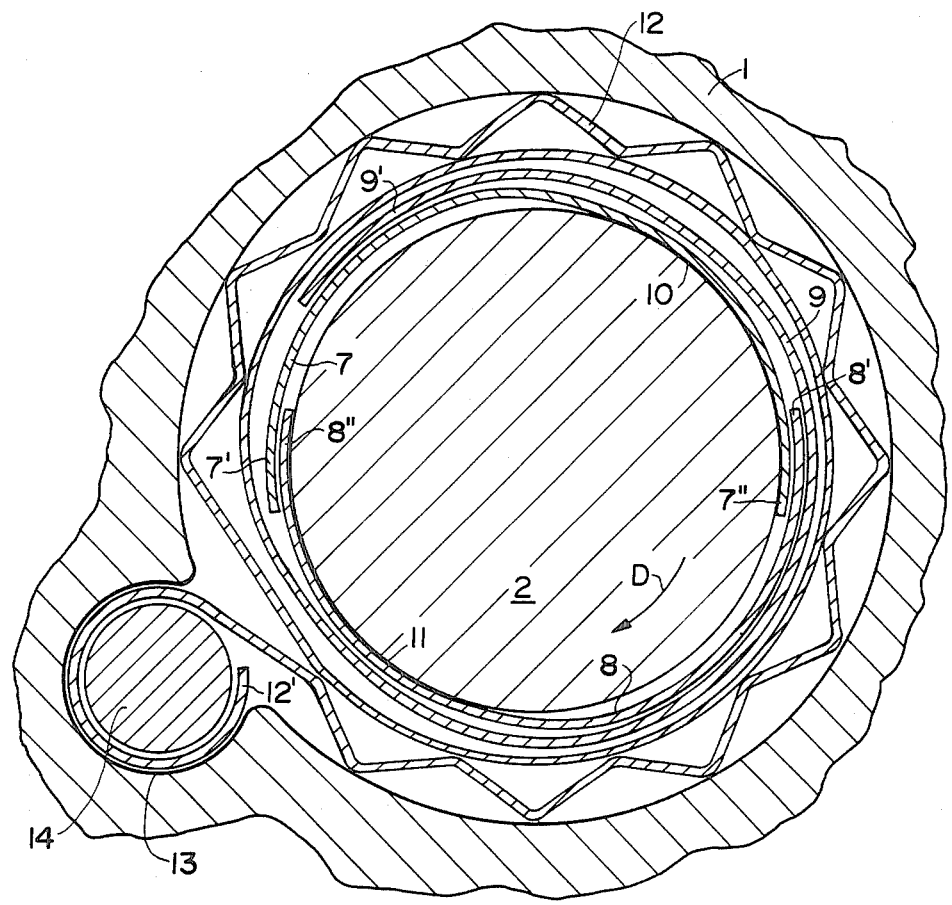
FIG. 2 is a sectional view similar to that of FIG. 1, but showing another embodiment of a foil-air bearing according to the invention, wherein a portion of the outer foil band section is corrugated.

The example embodiment of FIG. 2 differs from that of FIG. 1 in that the inner foil section forming the inner contact or running surface of the bearing, is constructed of two separate foil or band portions 7, 8 each of which forms a partial shaft encircling loop, in a manner so that their outer ends 7', 8' overlap the inner ends 8'', 7'' located directly adjacent to or in contact with the shaft surface. The inner ends 8'', 7'' are arranged in a run-off relative to the rotation direction D of the shaft 2, i.e. the free cut ends face in the rotation direction D of the shaft 2. Further, a smooth-walled outer band or foil portion 9 of the outer foil section forms a transition into an outer band or foil portion 12 which is preformed into a uniformly waved or corrugated shape connected to the smooth portion 9. This outer preformed wavy band or foil portion 12 extends between the bearing shell inner wall on one side, and the smooth-walled band portion 9 on the other side.

Further, the smooth-walled band portion 9 and the wavy outer band portion 12 are wrapped in the direction D of rotation of the shaft 2, but in FIG. 2, the inner band or foil portions 7, 8 forming the inner contact or running surface of the bearing, are wrapped opposite to the rotation direction D of the rotating shaft 2 as is the inner foil or band portion 3 in FIG. 1. These two inner band portions 7, 8 are connected at the locations 10 and 11 to the smooth-walled band portion 9 of the outer foil section which includes the end portion 9', the smooth-walled portion 9, and the corrugated portion 12. These connections 10, 11 are located in such a manner that the band or foil end portion 9' of the outer foil section extends at least as a partially encircling loop through the connection locations 10 and 11 and so that the end portion 9' lies between looping portions of the outer foil section on one side and the inner band portions 7, 8 of the inner foil section on the other side. The radially outer ends 7', 8' of the inner band portions 7, 8 are also encircled by the band portion 9 of the outer foil or band section. The connection locations 10 and 11 may preferably be arranged in one common bearing meridian plane, or they may be uniformly spaced from each other around the bearing circumference. Further, as in FIG. 1, the foil connections at the locations 10 and 11 may also be achieved by means of pressure welding, soldering, diffusion welding or ultrasonic welding. The same applies to connections 10, 11 in the example embodiments of FIGS. 4 and 5.

In FIG. 2 the radially outer end 12' of the foil or band portion 12 is secured to the bearing shell 1. For this purpose the end 12' is looped around a pin or bolt 14 arranged with rotational symmetry within a recess 13 in the bearing shell 1, whereby the recess 13 has an axis arranged in parallel with the bearing axis. By this manner of securing the outer end 12' of the band portion 12 in the bearing shell 1, a continual soft or smooth foil band curve as well as a smooth transition from the smooth-walled foil secured foil or band end 12' to the wavy foil structure 12 may be achieved.

Figure 3:
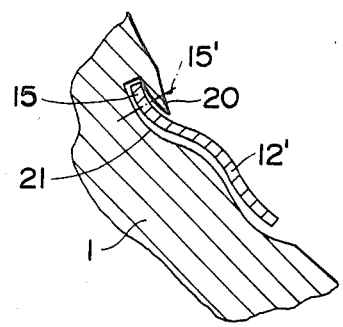
FIG. 3 is a detailed view of an example for securing a foil end to a bearing shell.

FIG. 3 shows another possibility of securing an outer end 12' of a foil or band portion such as the band portion 12 in a substantially tangential slot 15 in the bearing shell 1 in a manner similar to that of FIG. 1; for example with a bolt or screw 15'. The slot 15 may be bounded on the radially inner side by a lip 20 and radially outwardly by a curved wall portion 21 so that the lip 20 presses the foil end 12' against the curved wall portion 21 for a secure fit.

Figure 4:
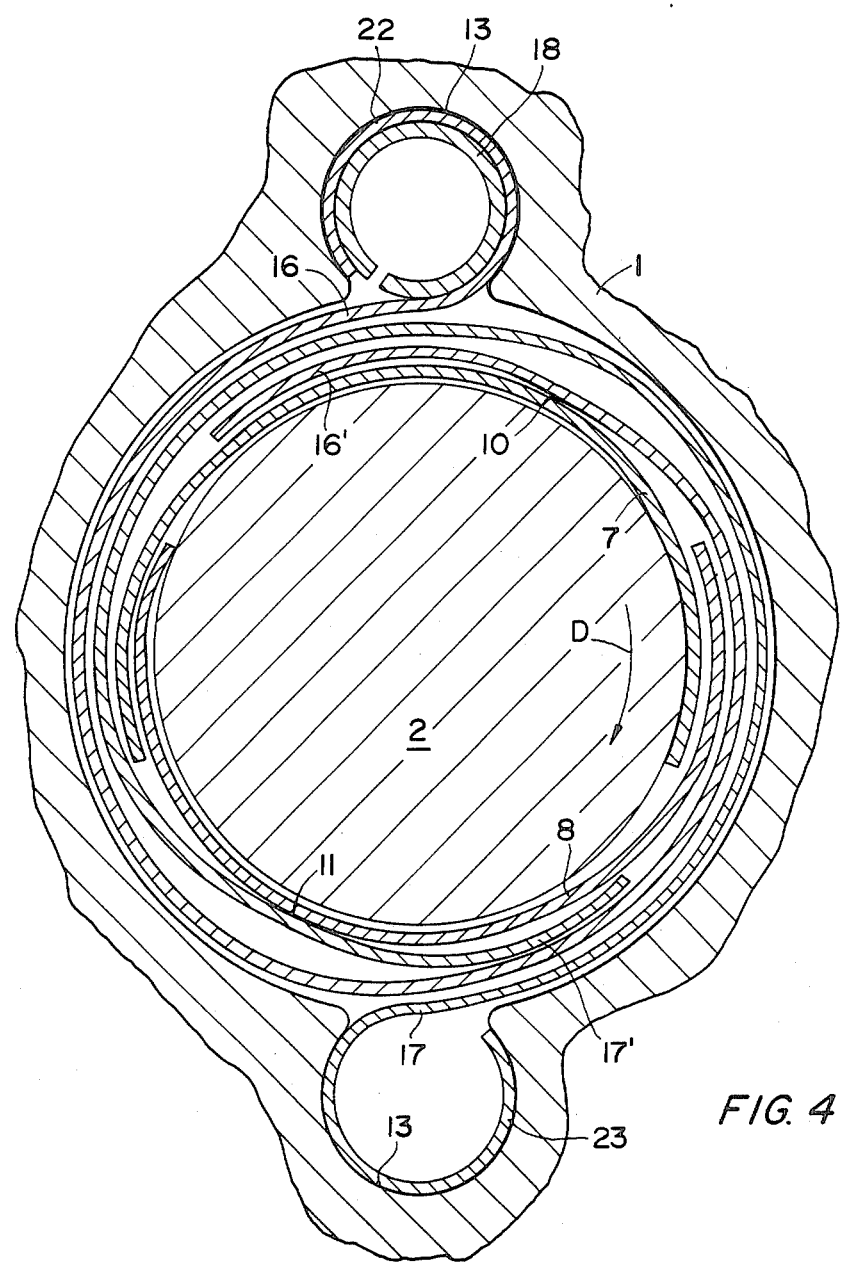
FIG. 4 is a sectional view similar to that of FIG. 1, but showing still another embodiment of a foil-air bearing according to the invention with two inner and two outer foil band portions.

The bearing variation of FIG. 4 comprises two outer band portions 16 and 17 forming an outer foil section and two inner foil or band portions 7 and 8 forming an inner foil section. The portions 16 and 17 are secured to the bearing shell 1 at their outer ends 22 and 23 in grooves 13 by spring expansion sleeves 18 clamping the foil ends in place. The portions 16, 17 loop around each other at least partially and lead to the inner band portions 7, 8 forming the inner foil section. The inner foil portion 7 is connected at 10 to the outer foil portion 16. The inner foil portion 8 is connected at 11 to the outer foil portion 17. Seen from the inside to the outside, the band portions 16, 17 of the outer foil section are wrapped in the same direction as the rotation direction D of the bearing shaft 2. The radially inner ends 16', 17' of the two band portions 16, 17 of the outer foil section overlap the respective connection locations 10, 11 and are arranged between the band portions 7, 8 of the inner foil section on one side and a respective radially further-out turn of the corresponding foil portion 17, 16 on the other side.

In FIG. 4 the above described securing of the foil or band ends 22 and 23 makes sure that the respective foil or band portions 16, 17 merge smoothly into the bearing shell cavity and hug closely the inner wall surface of the bearing shell cavity along the first half turn as viewed from the connected ends 22, 23. Instead of a bolt 14 as in FIG. 2, the tube or bushing type expansion sleeve 18 is used to elastically clamp the respective foil end within the recess 13 of the bearing shell 1. Otherwise, what has been said with regard to FIG. 2 is also true for FIG. 4 as to the construction of the inner foil section formed by the two band portions 7, 8. Further, in FIG. 4 all foil portions 7, 8 and 16, 17 comprise a smooth-walled structure.

Figure 5:
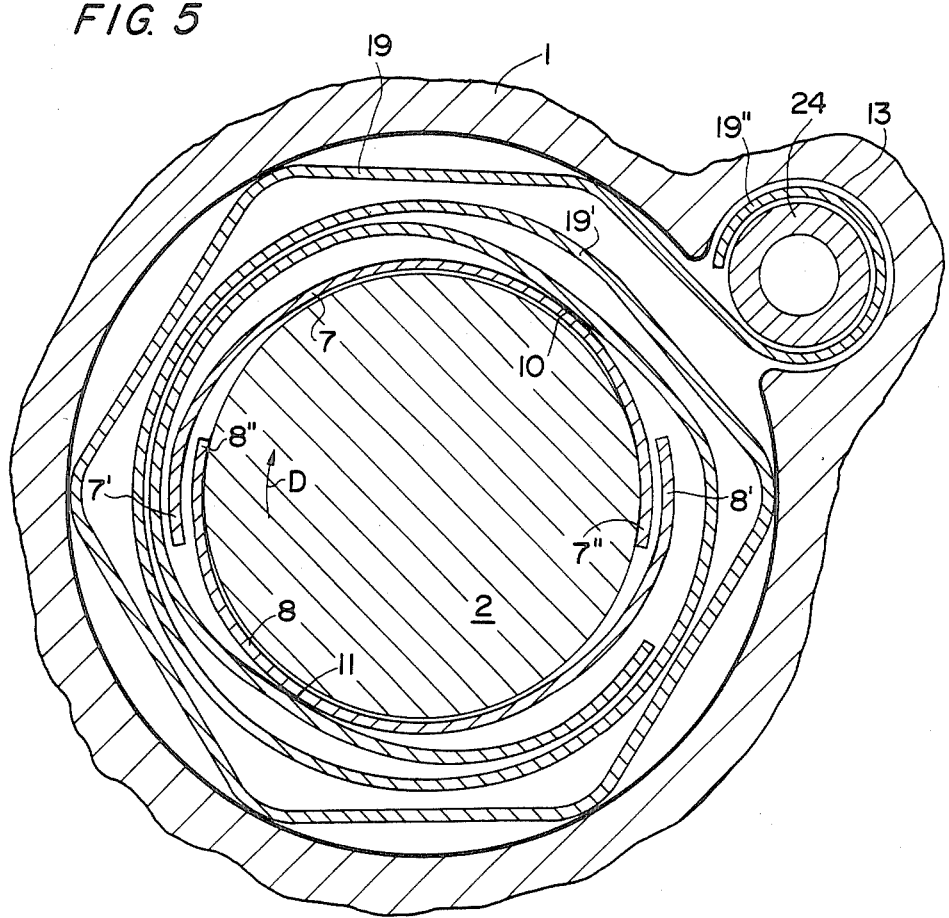
FIG. 5 is a sectional view similar to that of FIG. 1, but showing yet another embodiment of a foil-air bearing according to the invention, wherein an outer foil band portion forms at least with its outermost turn a polygonal configuration.

FIG. 5 uses the same reference numbers for components which are the same as in FIG. 2. The example embodiment of FIG. 5 differs from that of FIG. 2 primarily in that an outer band or foil portion 19 having a preformed polygonal shape extends around the circumference of the bearing substantially for an entire turn between the inner wall of the bearing shell 1 and a smooth-walled band or foil portion 19' of the outer foil section. This polygonal preformed band or foil portion 19 merges into the smooth-walled band portion 19' which is connected at 10 and 11 to the inner foil or band portions 7, 8 forming the inner contact or running surface of the bearing. The outer foil section comprising the band portions 19, 19', 19" is wrapped in the same direction as the rotation direction D of the rotating shaft 2, whereas the band portions 7 and 8 forming the inner contact surface or running surface of the bearing are wrapped in a direction opposite the rotation direction D, as described above with reference to FIG. 2. The outer end 19" of the foil band portion 19, may for example, be looped around a sleeve-like member 24 for securing the outer foil section to the bearing shell 1 in the recess 13 as in FIG. 2 or, alternately as in any of the other figures.

The described possibilities of securing a foil or band end to the bearing shell are examples only. Any other type of securing means is also suitable for the purposes of the invention as long as the required secure holding of the foil or band end is assured. For example securing the foil or band end in a radial slot rather than in a tangential slot may be quite feasible.

Figure 6:
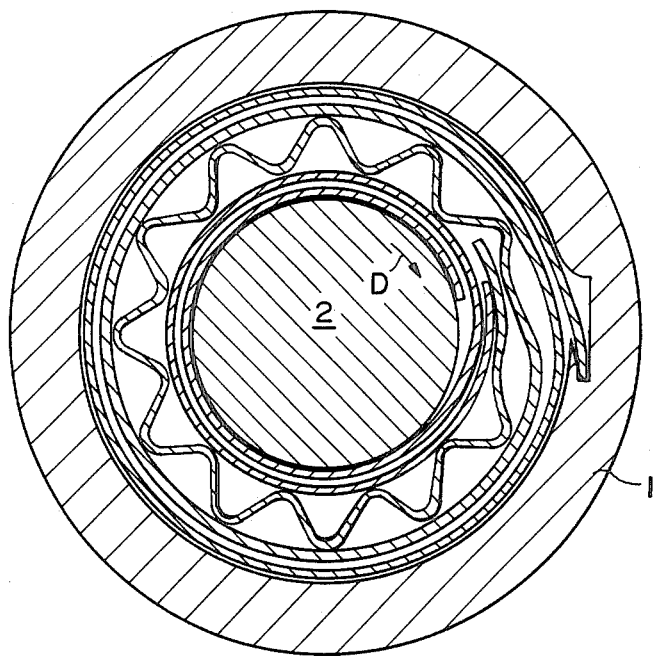
FIG. 6 is a sectional view similar to that of FIG. 1 and showing a further embodiment of a foil-air bearing of the invention, wherein a configured portion of an outer foil section is surrounded by a smooth portion of the outer foil section.

FIG. 6 shows a further bearing variation of the invention comprising at least one smooth-walled band or foil portion forming the inner foil section wrapped opposite to the shaft rotation direction D and connected to a further band portion of the outer foil section which is configured to have a desired shape such as a wavy or polygonal shape and at least in effect completely encircles or loops around the shaft at least once. The remaining portions of these outer band or foil sections are smooth-walled and form at least in effect a partially or completely encircling loop around the shaft in the rotation direction.

It is an unpredictable advantage of the present invention that, despite the opposing wrapping directions of the separate inner and outer band sections, a good, homogenous bearing damping is achieved according to the invention. Such good homogenous damping characteristics are especially pronounced in the bearings of the invention in which the ends of the inner foil portions 7, 8 overlap in a spiral manner, and where extensions of these overlapping portions form loops partially encircling the shaft or adjacent loops. The necessary spring action due to the expansion effect of the outer foil section wrapped in the shaft rotation direction is achieved primarily by the outer foil section. The required bearing stiffness may be achieved or adjusted by the illustrated corrugated, wavy, polygonal or similar configuration of at least a portion of the outer foil or band section. Depending on specific operational requirements, it is possible according to the invention, to increase the number of the foil or band portions forming the inner and/or outer foil or band sections.

Although the invention has been described with reference to specific example embodiments, it will be appreciated, that it is intended to cover all modifications and equivalents within the scope of the appended claims.

What is claimed is:

1. An aerodynamic radial foil-air bearing, especially for high speed fluid flow engines, comprising bearing shell means (1), a bearing shaft rotating in a given rotational direction (D) in said bearing shell means, a gap between an inner wall surface of said bearing shell means and said bearing shaft, foil means operatively located in said gap, said foil means comprising an inner foil section (3) forming a bearing running surface around said shaft, said inner foil section (3) being wound in a direction (W3) opposite to said given rotational direction (D) such that at least one of its innermost ends in direct contact with the surface of said bearing shaft has an edge (A) facing in said rotational direction (D) of said bearing shaft, said foil means further comprising an outer foil section (4) forming a support around said inner foil section (3), said outer foil section (4) being wound in said given rotational direction (D) of said bearing shaft so that at least one outermost end of said outer foil section (4) enters approximately tangentially into said bearing shell means (1) and in a direction corresponding to said given rotational direction (D), first means (5, 10, 11) rigidly interconnecting a portion of said inner foil section to a portion of said outer foil section, and second means (6, 13, 14, 15, 18, 24) operatively connecting an outermost end of said outer foil section to said bearing shell means (1), whereby an accumulation of contaminations at said edge (A) and a rotation of the entire foil means with said bearing shaft are avoided.

2. The bearing of claim 1, wherein said inner foil section is constructed as a winding which partially or completely loops around said shaft.

3. The bearing of claim 1, wherein said outer foil section is constructed as a winding which partially or completely loops around said inner foil section.

4. The bearing of claim 1, wherein said inner foil section (3) has a length larger than a circumference of said bearing shaft so that ends (3', 3'') of said inner foil section (3) overlap in such a way that a cut off edge of the end adjacent to said bearing shaft faces in the given rotational direction of said bearing shaft, whereby contaminations are prevented from accumulating near said cut edge.

5. The bearing of claim 1, wherein said inner foil section comprises two foil portions (7, 8) each of which is longer than one half of a circumference of said bearing shaft, whereby a first end (7'', 8'') of each foil portion (7, 8) adjacent to said shaft (2) is overlapped by a second end (7', 8') of the other foil portion in such a way that a cut edge adjacent to said end (7'', 8'') faces in said given rotational direction of the shaft (2), whereby contaminations are prevented from accumulating near said cut edge.

6. The bearing of claim 1, wherein said first connecting means are so located that an inner winding end of said outer foil section is sandwiched between at least a portion of said inner foil section on one side and a further portion of said outer foil section on the other side of said inner winding end of said outer foil section, whereby at least a portion of said inner foil section is encircled by a portion of said outer foil section.

7. The bearing of claim 1, wherein said outer foil section comprises two outer foil portions each being wound in said given rotational direction of said shaft, said second connecting means comprising members for securing each of said two outer foil portions to said bearing shell means, said outer foil portions having winding beginnings sandwiched between said inner foil section on one side and said outer foil section on the other side, said first connecting means being located outside said winding beginnings so that said first connecting means (10, 11) are overlapped by said winding beginnings.

8. The bearing of claim 1, wherein said outer foil section comprises two outer foil portions, wherein said inner foil section comprises two inner foil portions, and wherein said first connecting means (10, 11) are located in overlap zones between respective foil portions.

9. The bearing of claim 8, wherein said first connecting means (10, 11) are located in a common plane preferably a meridional plane of said bearing.

10. The bearing of claim 1, wherein said first connecting means comprise welded, soldered, brazed, or fused connections.

11. The bearing of claim 1, wherein said inner and outer foil sections comprise smooth-walled bands or tapes of suitable material.

12. The bearing of claim 1, wherein said outer foil section comprises at least one outer smooth-walled portion and at least one configured portion merging into each other, said configured portion being located between an inner wall of said bearing shell means and said outer smooth-walled portion, both of said portions being wound in the given rotational direction of said bearing shaft, said inner foil section comprising at least one inner smooth-walled portion wound in a direction opposite to said rotational direction, said first connecting means interconnecting said outer smooth-walled portion with said inner smooth-walled portion of said inner foil section.

13. The bearing of claim 12, wherein said configured portion has a polygonal configuration looping substantially around the entire bearing shaft and around said outer smooth-walled portion, said inner foil section being interconnected to said polygonal configuration through said outer smooth-walled portion by said first connecting means.

14. The bearing of claim 1, wherein said second connecting means comprise a recess in said bearing shell means, said recess opening into said gap, said outer most end of said outer foil section reaching into said recess, and means clamping said outer end of said outer foil section in said recess.

15. The bearing of claim 14, wherein said recess is a slot and wherein said clamping means is a slot tightening means.

16. The bearing of claim 14, wherein said recess is a bore extending substantially in parallel to a rotational axis of said bearing shaft, said clamping means comprising a member fitting into said bore, and wherein said approximately tangentially entering outer most end of said outer foil section curls in to said bore for anchoring by said clamping means.

17. The bearing of claim 16, wherein said fitting member is a bolt or slotted bushing exerting a clamping force on a curled portion of said outer end of said outer foil section.

18. The bearing of claim 1, wherein said inner foil section comprises one or more smooth-walled inner foil portions wound in a direction opposite to said given rotational direction, wherein said outer foil section comprises a configured foil portion and a smooth-walled outer foil portion merging into said configured foil portion, said first connecting means connecting said configured foil portion to at least one of said smooth-walled inner foil portions, said configured foil portion forming at least one full turn around said inner foil section, said outer foil portion being wound at least partially around said configured foil portion in a direction corresponding to said rotational direction of said shaft.

19. The bearing of claim 18, wherein said configured foil portion is corrugated or wave shaped.

20. The bearing of claim 18, wherein said configured foil portion is polygonal.

* * * * *